| (12) | United States Patent | (10) Patent No.: | US 8,151,762 B2 |
|---|---|---|---|
| | Nishimoto et al. | (45) Date of Patent: | Apr. 10, 2012 |

(54) DIRECT-INJECTION SPARK-IGNITION ENGINE

(75) Inventors: Toshiaki Nishimoto, Hiroshima (JP);
Tomomi Watanabe, Hiroshima (JP);
Yoshiteru Nakayama, Hiroshima (JP);
Tatsuya Fujikawa, Hiroshima (JP);
Masahisa Yamakawa, Hiroshima (JP)

(73) Assignee: Mazda Motor Corporation (JP)

( * ) Notice: Subject to any disclaimer, the term of this patent is extended or adjusted under 35 U.S.C. 154(b) by 258 days.

(21) Appl. No.: 12/504,445

(22) Filed: Jul. 16, 2009

(65) Prior Publication Data

US 2010/0175660 A1    Jul. 15, 2010

(30) Foreign Application Priority Data

Jul. 17, 2008   (JP) .................................. 2008-186019

(51) Int. Cl.
F02B 19/04    (2006.01)

(52) U.S. Cl. ... 123/298; 123/299; 123/305; 123/406.47; 123/491; 701/105; 701/113

(58) Field of Classification Search .................. None
See application file for complete search history.

(56) References Cited

U.S. PATENT DOCUMENTS

| 7,770,556 B2 * | 8/2010 | Kihara et al. | 123/299 |
| 2003/0230275 A1 * | 12/2003 | Kuno et al. | 123/261 |
| 2006/0102141 A1 * | 5/2006 | Nakayama et al. | 123/298 |
| 2006/0219212 A1 * | 10/2006 | Brachert et al. | 123/295 |
| 2007/0068482 A1 * | 3/2007 | Yamashita et al. | 123/276 |
| 2007/0079797 A1 * | 4/2007 | Kihara et al. | 123/298 |
| 2009/0235897 A1 * | 9/2009 | Fujikawa et al. | 123/305 |

FOREIGN PATENT DOCUMENTS

| EP | 1770256 A2 | 4/2007 |
| JP | 2006-250050 A | 9/2006 |
| JP | 2007-092693 A | 4/2007 |
| JP | 2007-154827 A | 6/2007 |

* cited by examiner

*Primary Examiner* — Stephen K Cronin
*Assistant Examiner* — Sherman Manley
(74) *Attorney, Agent, or Firm* — Studebaker & Brackett PC; Donald R. Studebaker

(57) ABSTRACT

Disclosed is a direct-injection spark-ignition engine designed to promote catalyst activation during cold engine operation. A fuel injection timing for a fuel injection period in an compression stroke (second fuel injection period F2) is set to allow a first fuel spray Ga injected from a first spray hole 40a to enter a cavity 34 in a piston crown surface 30, and allow a second fuel spray Gb to impinge against a region of the piston crown surface 30 located closer to an injector than the cavity 34, so as to cause the second fuel spray Gb having a lowered penetration force due to the impingement to be pulled toward the cavity 34 by a negative pressure generated in the cavity 34 as a result of passing of the first fuel spray Ga therethrough. The direct-injection spark-ignition engine can maximally hold an injected fuel spray around a spark plug to reliably stabilize a combustion state in a combustion mode for promoting catalyst activation during cold engine operation, while enhancing combustion efficiency in a homogenous combustion mode during normal engine operation.

12 Claims, 15 Drawing Sheets

ENLARGED VIEW OF INJECTION SURFACE

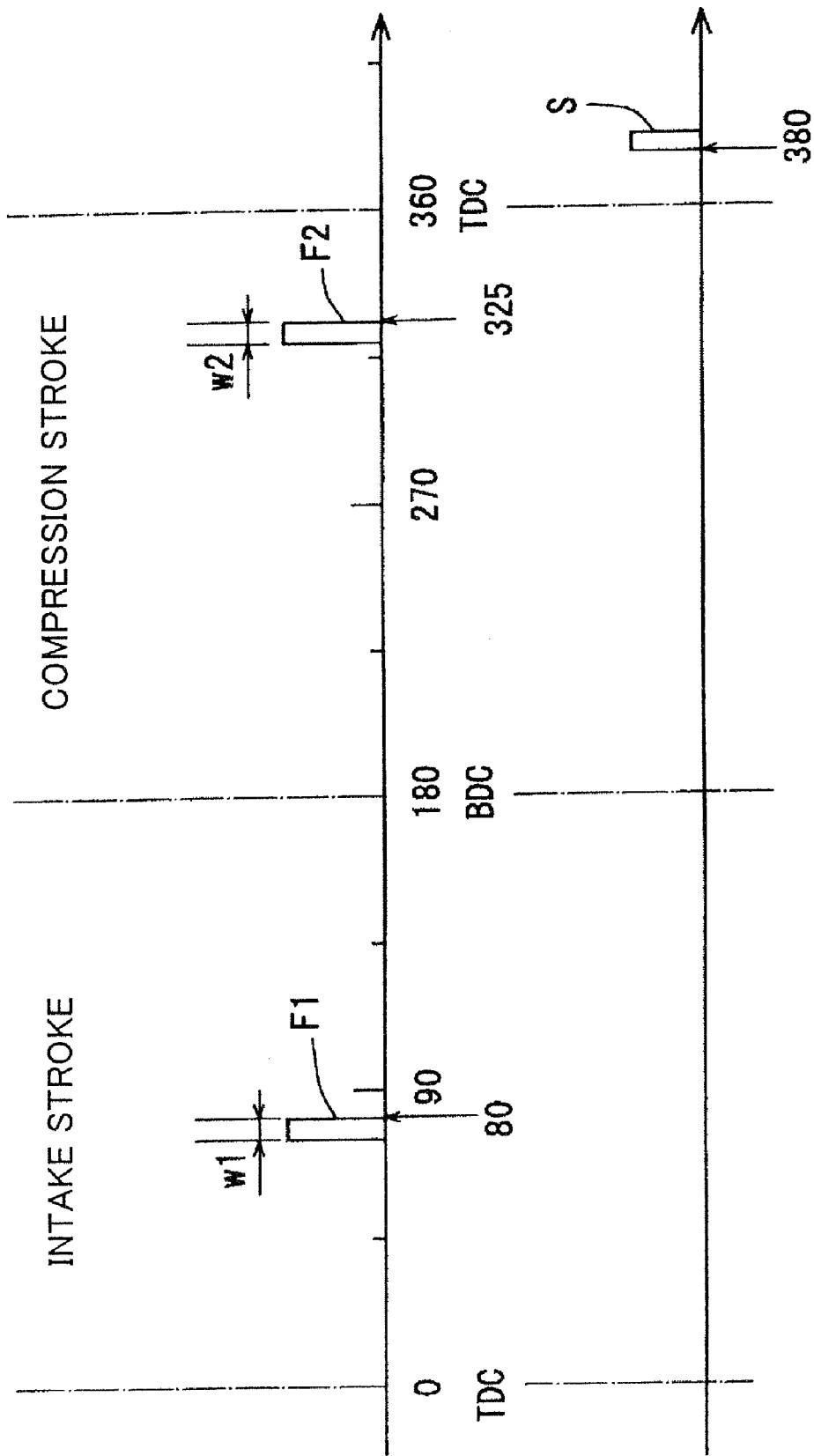

ENLARGED VIEW OF
INJECTION SURFACE

US 8,151,762 B2

DIRECT-INJECTION SPARK-IGNITION ENGINE

BACKGROUND OF THE INVENTION

1. Field of the Invention

The present invention relates to a direct-injection spark-ignition engine, and more particularly to a direct-injection spark-ignition engine designed to promote catalyst activation during cold engine operation.

2. Description of the Background Art

Heretofore, with a view to achieving improvement in fuel economy, a direct-injection spark-ignition engine operable to directly inject fuel into each cylinder has been employed. In such a direct-injection spark-ignition engine, a compression ratio can be set at a relatively high value to enhance engine efficiency, and a fuel injection amount can be freely adjusted regardless of an intake air amount.

Late years, in connection with tighter exhaust emission regulations, there has been an increasing need for achieving earlier catalyst activation. The earlier catalyst activation requires quickly raising an exhaust gas temperature. As means to raise an exhaust gas temperature, it is contemplated to maximally retard an ignition timing.

However, a large amount of ignition timing retard causes deterioration in combustion stability. Thus, it has been expected to provide a technique of retarding the ignition timing while ensuring combustion stability.

In this connection, JP 2006-250050A (hereinafter referred to as Patent Document 1) proposes a control system for a direct-injection spark-ignition engine, wherein a fuel injection period is divided into a main injection period for injecting fuel at a first timing set in a range across a top dead center of a compression stroke (compression TDC) and an early injection period for injecting fuel at a second timing earlier than the first timing (e.g., during an intake stroke), and combustion is produced under a condition that an ignition timing is largely retarded relative to the compression TDC.

In this engine control system, fuel is preliminarily injected at an early timing (e.g., during an intake stroke) to allow the injected fuel to be spread over a combustion chamber in each cylinder before the fuel injection in the main injection period, so that combustion initiated by igniting a fuel spray in the main injection period will progress in the combustion chamber at a relatively slow speed. This makes it possible to stably produce combustion.

In other words, the engine control system is designed to change a state of an air-fuel mixture in each cylinder from a so-called "stratified mode" where a rich air-fuel mixture exists around a spark plug and only air exists around the rich air-fuel mixture, to a so-called "weak-stratified mode" where a lean air-fuel mixture exists around the rich air-fuel mixture.

As disclosed in the Patent Document 1, it is contemplated to employ a multi-hole injector as a fuel injector for a direct-injection spark-ignition engine. A direct-injection spark-ignition engine using the multi-hole injector is also disclosed, for example, in JP 2007-092693A (hereinafter referred to as Patent Document 2).

In the engine disclosed in the Patent Document 2, a fuel spray is introduced into a concave portion provided in a piston crown surface to enhance robustness of stratified combustion and facilitate vaporization/atomization in a homogenous combustion region.

JP 2007-154827A (hereinafter referred to as Patent Document 3) discloses an engine, wherein a concave portion in a piston crown surface is formed to have a spherically curved sub-surface with a center at an ignition point of a spark plug. The concave portion having a spherically curved sub-surface can define a generally spherical-shaped combustion chamber, so that a homogenous and excellent combustion state can be constantly maintained.

In the engine control system disclosed in the Patent Document 1, the fuel injection in the main injection period has to be performed at the first timing set in the range across a compression TDC at which an in-cylinder pressure is maximized. This gives rise to a need for setting an injection pressure of a fuel injector at an extremely high value. Moreover, fuel is injected toward a spark plug, and thereby combustion has to be initiated under a condition that an ignition timing of the spark plug is accurately coincident with a timing when the injected high-pressure fuel spray reaches the spark plug.

However, in the operation of injecting fuel from the fuel injector toward the spark plug at a high pressure, the management of an fuel injection timing becomes more critical. Specifically, if the fuel injection timing deviates from an adequate point even slightly, a problem of deterioration in combustion state will occur. Particularly, during cold engine operation, it is difficult to reliably keep the fuel injection timing constant, due to high fuel viscosity.

Further, if the fuel injector is arranged to inject fuel toward the spark plug as in the Patent Document 1, fuel cannot be injected toward a lower region of the combustion chamber in a homogenous combustion mode during normal (warmed-up) engine operation, to cause a problem of deterioration in combustion efficiency during the homogenous combustion mode.

The engine disclosed in the Patent Document 2 is not originally intended to provide measures for early catalyst activation during cold engine operation, and thereby cannot solve the problems in the Patent Document 1. Similarly, the engine disclosed in the Patent Document 3 is not originally intended to provide measures for early catalyst activation during cold engine operation, and thereby cannot solve the problems in the Patent Document 1.

SUMMARY OF THE INVENTION

In view of the above circumstances, it is an object of the present invention to provide a direct-injection spark-ignition engine capable of maximally holding an injected fuel spray around a spark plug to reliably stabilize a combustion state in a combustion mode for promoting catalyst activation during cold engine operation, while enhancing combustion efficiency in a homogenous combustion mode during normal engine operation.

In order to achieve this object, the present invention provides a direct-injection spark-ignition engine which comprises a multi-hole injector adapted to inject a plurality of fuel sprays obliquely downwardly from a peripheral position of a roof wall surface defining a combustion chamber, a spark plug disposed at a center of the combustion chamber-defining roof wall surface, and a concave cavity provided in a central region of a piston crown surface of a piston located in opposed relation to the spark plug. In the direct-injection spark-ignition engine, the injector has at least two spray holes consisting of a first spray hole adapted to form a first fuel spray in such a manner as to, after being injected, directly enter the cavity at a given timing in a later period of a compression stroke, and a second spray hole adapted to form a second fuel spray in such a manner as to be located below the first fuel spray, and wherein a timing of fuel injection from the injector during cold engine operation is set in such a manner as to allow the first fuel spray to be turned toward the combustion chamber-defining roof wall surface after entering the cavity, and allow the second fuel spray to impinge against a region of the piston crown surface located closer to the injector than the cavity, so as to cause the second fuel spray having a lowered penetration force due to the impingement to be pulled toward the cavity by a negative pressure generated in the cavity as a result of passing of the first fuel spray therethrough, and held around the spark plug.

BRIEF DESCRIPTION OF THE DRAWINGS

FIGS. 3A and 3B illustrate a detail structure of the piston itself, wherein FIG. 3A is a top plan view of the piston, and FIG. 3B is a sectional view taken along the line B-B in FIG. 3A.

FIG. 4 is a time chart showing a fuel injection timing and an ignition timing, during cold engine operation.

FIGS. 7A and 7B are side views schematically showing movements of injected fuel sprays, wherein FIG. 7A illustrates a state of the fuel sprays just after being injected, and FIG. 7B illustrates a state of the fuel sprays after a certain time has elapsed from the state in FIG. 7A.

DESCRIPTION OF THE PREFERRED EMBODIMENTS

With reference to the drawings, the present invention will now be specifically described based on an embodiment thereof.

Figure 1:
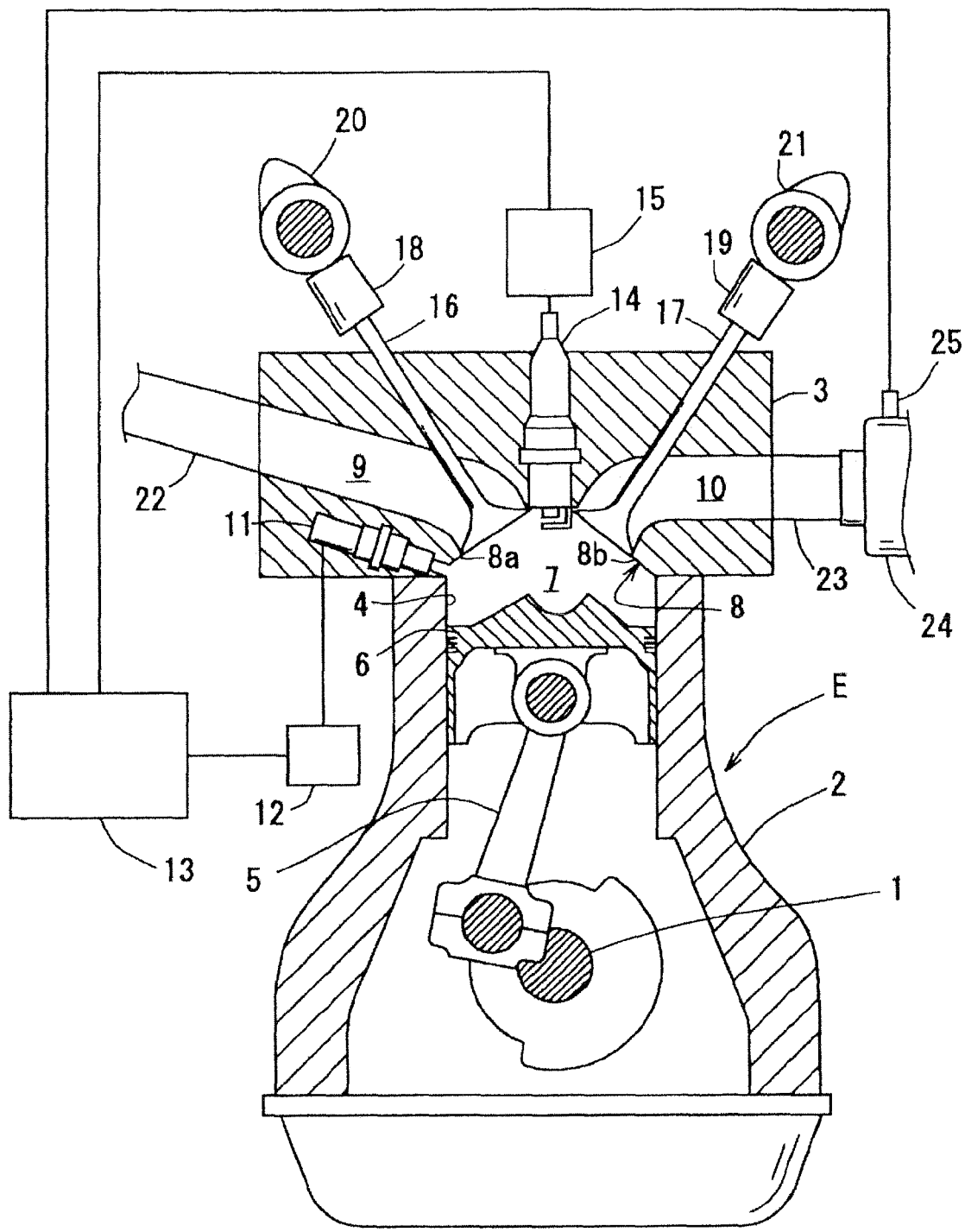
FIG. 1 is a schematic block diagram showing a direct-injection spark-ignition engine according to a first embodiment of the present invention.

FIG. 1 is a schematic block diagram showing a direct-injection spark-ignition engine according to a first embodiment of the present invention. As shown in FIG. 1, this engine E is a four-cycle reciprocating spark-ignition engine, which integrally has a cylinder block 2 rotatably supporting a crankshaft 1, and a cylinder head 3 disposed above the cylinder block 2. The cylinder block 2 and the cylinder head 3 are formed to have a plurality of cylinders 4 thereinside.

A piston 6 is fittingly inserted into each of the cylinders 4, while being connected to the crankshaft 1 through a connecting rod 5, so that a combustion chamber 7 is defined above the piston 6.

The cylinder head 3 has a lower surface partially formed as a roof wall surface 8 defining the combustion chamber 7 of each of the cylinders 4. The roof wall surface 8 is formed in a so-called "pentroof shape" which has two inclined sub-surfaces 8a, 8b extending from a center thereof to a lower end of the cylinder head 3 in face-to-face relation.

Two mutually independent intake ports and two mutually independent exhaust ports are opened to the roof wall surface 8 defining the combustion chamber 7, and two intake valve 16 and two exhaust valve 17 are provided to respective corresponding ones of the intake ports 9 and the exhaust valves 10 to selectively open and close the respective ports 9, 10.

A multi-hole injector 11 connected to a fuel supply system is installed to communicate with a peripheral region of the combustion chamber 7 in a posture oriented obliquely downwardly. The injector 11 is operable, when the fuel injection system receives a pulse signal from a control unit 13 as an instruction on fuel injection, to inject fuel into the combustion chamber 7 in an amount corresponding to a pulse width of the pulse signal. A detailed structure of the injector 11 will be described later.

A spark plug 14 is provided for each of the cylinders 4, in such a manner that it is fixed to the cylinder head 3 while exposing an electrode thereof within the combustion chamber 7. The spark plug 14 is positioned at a center of an upper region of the combustion chamber 7. The spark plug 14 is connected to an ignition circuit 15 capable of electronically controlling an ignition timing, and controlled by the ignition circuit 15.

Each of the intake valves 16 and the exhaust valves 17 in each of the cylinders 4 is provided with a corresponding one of an intake tappet unit 18 and an exhaust tappet unit 19, and each of the intake tappet unit 18 and the exhaust tappet unit 19 is cyclically driven by a corresponding one of an intake cam 20 of an intake camshaft and an exhaust cam 21 of an exhaust camshaft in a valve operating mechanism.

A plurality of branch intake pipes 22 of an intake manifold are connected to the respective intake ports 9 of the engine E. Specifically, two of the branch intake pipes 22 are provided for each of the cylinders 4, and the branch intake pipes 22 are branched from an intermediate portion of the intake manifold to form a plurality of intake passages each having the same length.

A pair of branch exhaust pipes 23 formed in a two-forked shape are connected to respective ones of the exhaust ports 10 of each of the cylinders 4. A catalyst converter 24 is interposed in an exhaust passage downstream of the branch exhaust pipes 23 to purify exhaust gas. The catalyst converter 24 is provided with a catalyst temperature sensor 25 operable to detect a catalyst temperature. The catalyst temperature sensor 25 is used for detecting whether a temperature of a catalyst in the catalyst converter is raised to an activation temperature of the catalyst.

The control unit 13 comprises a CPU. A plurality of input element, such as the catalyst temperature sensor 25 and various other sensors (not shown) for detecting a state of the engine E (e.g., crank angle sensor), and a plurality of output elements, such as the fuel supply system 12 and the ignition circuit 15, are electrically connected to the control unit 13. Based on this electrical connection, the control unit 13 is operable to control an operating state of the engine.

Figure 2:
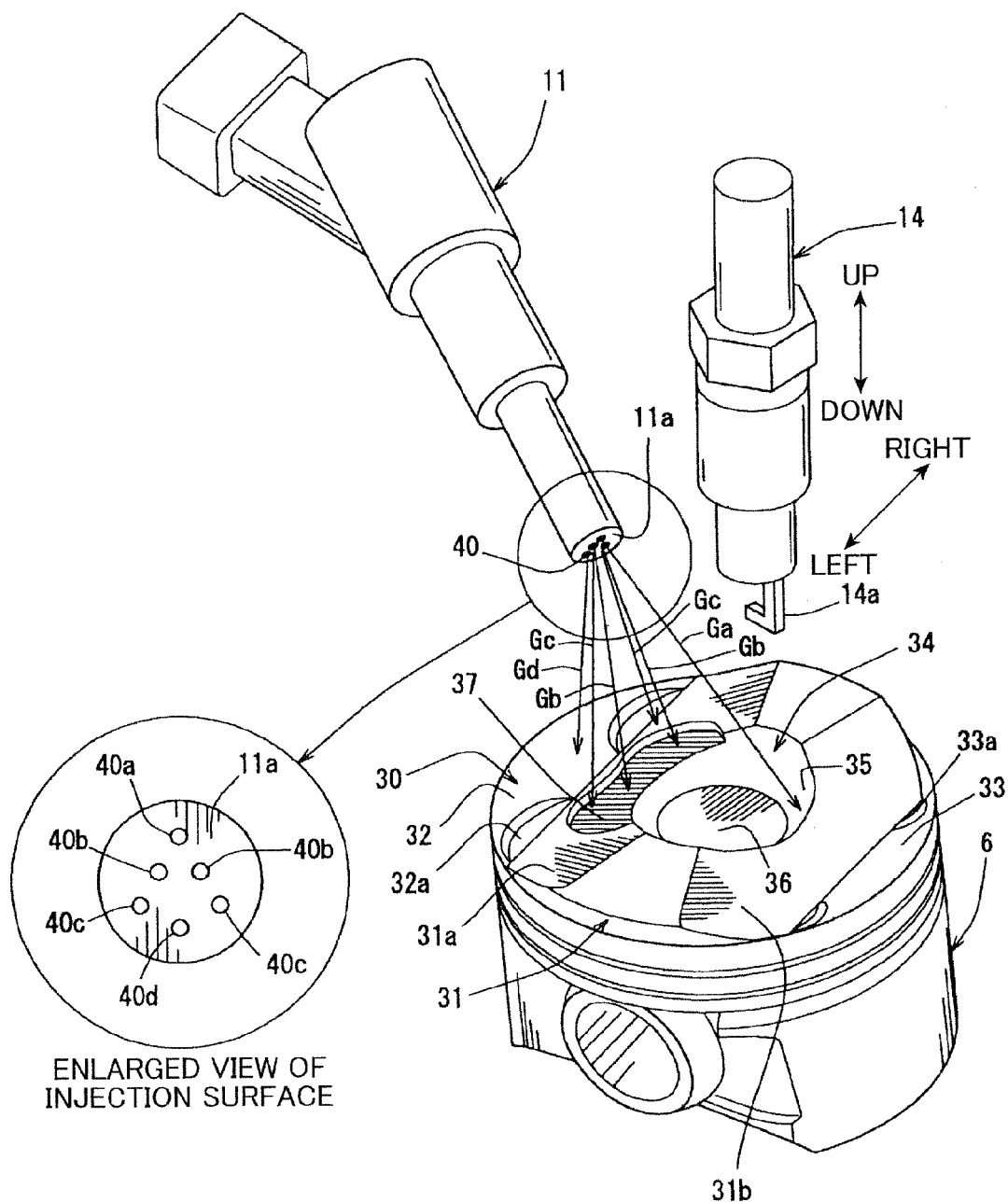
FIG. 2 is a perspective view showing a specific arrangement of a multi-hole injector, a piston and a spark plug in the direct-injection spark-ignition engine according to the first embodiment.

FIG. 2 is a perspective view showing a specific arrangement of the injector 11, the piston 11 and the spark plug 14. As shown in FIG. 2, the injector 11 is installed to allow an injection surface 11a as an edge surface thereof to be oriented in an obliquely downward direction, so as to inject a plurality of fuel sprays Ga, Gb, etc, toward a piston crown surface 30 of the piston 6.

The injection surface 11a of the injector 11 has six spray holes 40a, 40b, etc. More specifically, as shown in the enlarged view of the injection surface in FIG. 2, the injection surface 11a has one first spray hole 40a formed in an upper central region thereof, two second spray holes 40b, 40b formed in respective ones of right and left regions thereof below the first spray hole, two third spray holes 40c, 40c formed in respective ones of right and left regions thereof below the second spray holes, and one fourth spray hole 40d formed in a lower central region thereof, wherein the first to fourth spray holes are arranged in a given pattern.

In this manner, the spray holes 40a, 40b, etc, are formed in the injection surface 11a set in the above posture, so that the fuel sprays Ga, Gb, etc, can be injected obliquely downwardly from the spray holes 40a, 40b, etc, into the combustion chamber in each of the cylinders 4 all over and evenly. Thus, in a homogenous combustion mode during normal (warmed-up) engine operation, fuel is spread all over the combustion chamber in each of the cylinders 4. This makes it possible to efficiently produce combustion.

Further, during cold engine operation, a fuel injection timing can be adequately controlled in an after-mentioned manner to form an air-fuel mixture in the combustion chamber of each of the cylinders 4 in a weak-stratified mode. As used herein, the term "weak-stratified mode" means a state of an air-fuel mixture distribution in the combustion chamber of each of the cylinders 4 (in-cylinder air-fuel mixture) which is adjusted such that an air/fuel (A/F) ratio of an air-fuel mixture around the spark plug 14 becomes relatively high (rich), and the A/F ratio of an air-fuel mixture surrounding the rich air-fuel mixture becomes relatively low (lean).

Each of the spray holes 40a, 40b, etc, is formed to have an extremely small diameter (e.g., about 0.1 mm). An injection amount and an injection direction of a fuel spray from each of the spray holes 40a, 40b, etc, is determined by the diameter and an oriented direction of a respective one of the spray holes 40a, 40b, etc.

The oriented direction of each of the spray holes 40a, 40b, etc, is set correspondingly to a position of a respective one of the spray holes 40a, 40b, etc. Specifically, a first fuel spray Ga from the first spray hole 40a is oriented toward an uppermost position, and each of right and left second sprays Gb, Gb from the second spray holes 40b, 40b is oriented toward a position below the first fuel spray Ga and on a respective one of right and left sides of the first fuel spray Ga. Each of right and left third sprays Gc, Gc from the third spray holes 40c, 40c is oriented toward a position below the second fuel sprays Gb, Gb and on a respective one of a right side of the right second fuel spray Gb and a left side of the left second fuel spray Gb, and a fourth fuel spray Gd from the fourth spray hole 40d is oriented toward a lowermost position and a central position in a rightward-leftward direction. As also shown in FIG. 2, the first fuel spray Ga is set to be oriented toward a position below the electrode 14a of the spark plug 14 to prevent fuel from attaching onto the electrode 14a.

Figure 3A:
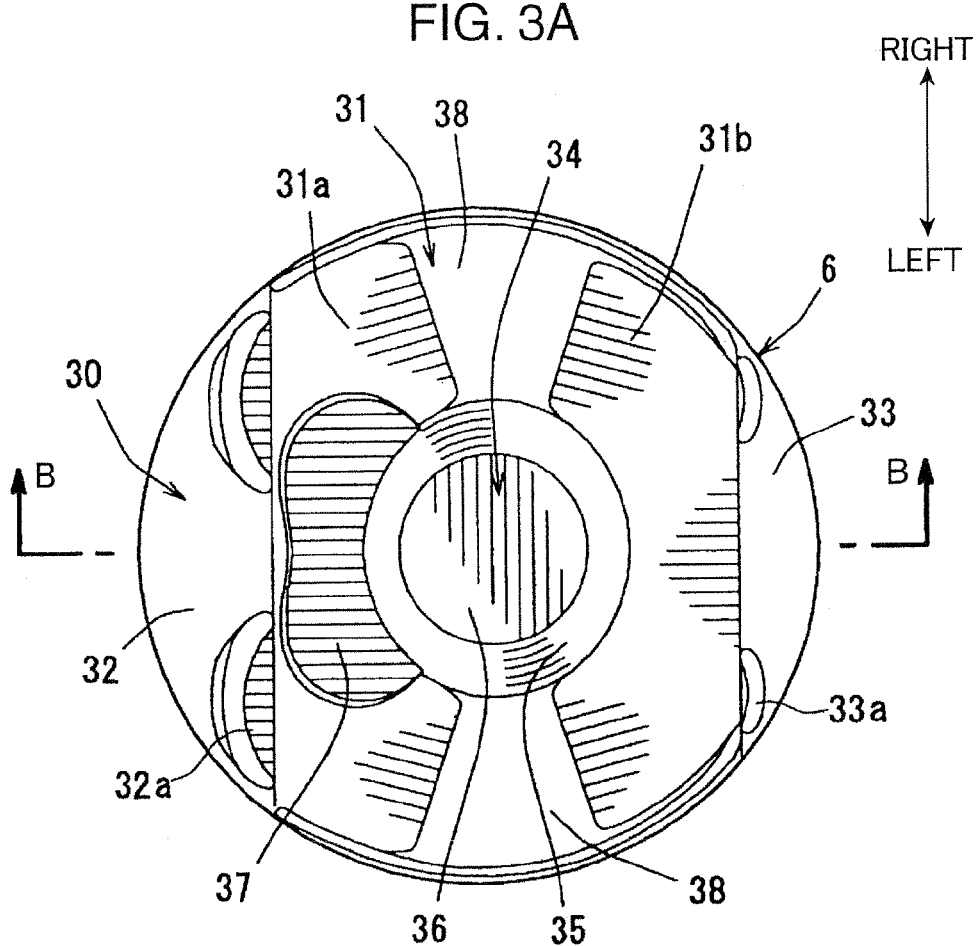
Figure 3B:
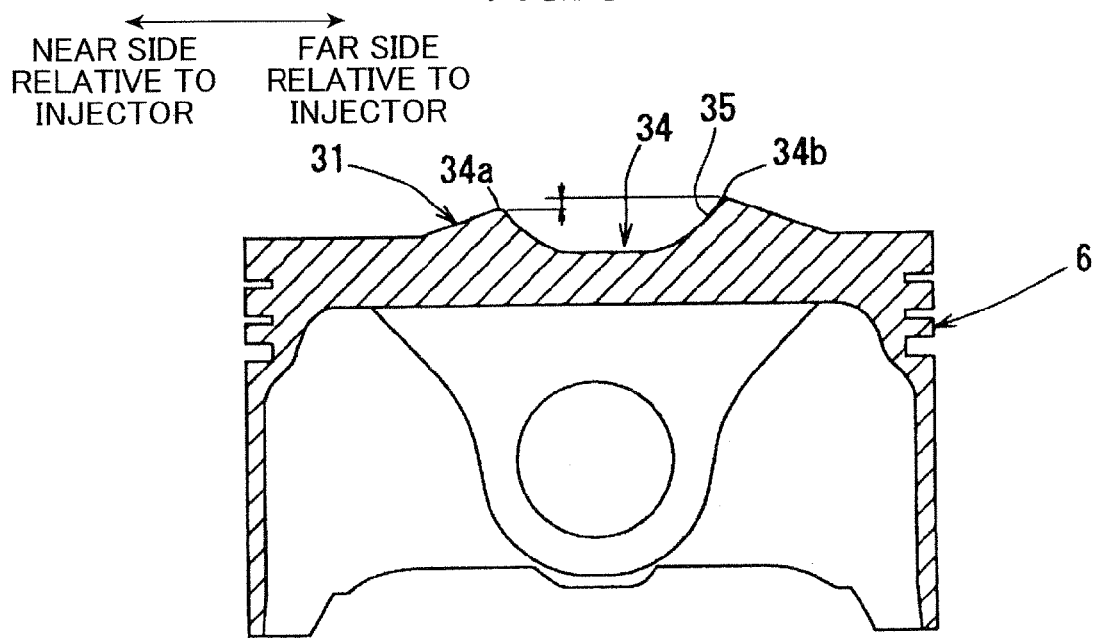

FIG. 3A is a top plan view of the piston 6, and FIG. 3B is a sectional view taken along the line B-B in FIG. 3A. As shown in FIGS. 3A and 3B and FIG. 2, the piston crown surface 30 of the piston 6 has a raised region 31. The raised region 31 has a pair of symmetrically opposed inclined sub-surfaces 31a, 31b each extending along a direction of the crankshaft (rightward-leftward direction). Each of the inclined sub-surfaces 31a, 31b of the raised region 31 is formed to be inclined in a pentroof shape which conforms to the pentroof-shaped roof wall surface 8 defining the combustion chamber 7.

The piston crown surface 30 further has first and second horizontal regions 32, 33 located on respective lateral sides of the raised region 31 to serve as a reference surface thereof. The first horizontal region 32 is located on a near side with respect to the injector 11 (such a position will hereinafter be referred to as "near-injector-side"), and the second horizontal region 33 is located on a far side with respect to the injector 11 (such a position will hereinafter be referred to as "far-injector-side"). The first horizontal region 32 is formed with two intake-valve recesses 32a corresponding to respective ones of the intake valves 16, and the second horizontal region 33 is formed with two exhaust-valve recesses 33a corresponding to respective ones of the exhaust valves 17.

Further, the piston crown surface 30 has a central region surrounded by the raised region 31 and formed to define a cavity 34 consisting of a concave portion having a generally circular shape in top plan view. The cavity 34 has an inner peripheral surface which comprises a bottom sub-surface 36 formed in a generally horizontal shape, and an arc-shaped sub-surface 35 (corresponding to "guide sub-surface" set forth in the appended claims) formed around the bottom sub-surface 36 to have an arc shape (mortar shape) in cross-sectional view. Thus, when the piston 6 is in a top dead center (TDC) position, the cavity 34 defines a combustion space having a generally spherical shape with a center at the electrode 14a of the spark plug 14.

The cavity 34 formed to define a generally spherical-shaped combustion space allows the engine to have a significantly high compression ratio and enhanced engine efficiency.

As shown in FIG. 3A, a part of the inclined sub-surface 31a located on an intake-side (near-injector-side) is formed to define a receiving portion 36 for receiving a fuel spray. The receiving portion 37 consists of a concave portion concavely depressed relative to the surrounding inclined sub-surface 31a, and has a guitar-like shape in top plan view.

The receiving portion 37 is formed to allow an upper edge thereof to reach the cavity 34, i.e., the receiving portion 37 and the cavity 34 are formed in continuous relation to each other. Thus, as shown in FIG. 3B, a near-injector-side upper edge 34a of the cavity 34 is located below a far-injector-side upper edge 34b of the cavity 34. This allows a fuel spray (Ga) injected from the injector 11 to readily enter into the cavity 34.

As shown in FIG. 3A, the raised region 31 further has a top sub-region including two upper sub-surfaces 38, 38 located respective ones of right and left sides of the cavity 34. Each of the upper sub-surfaces 38, 38 is formed as an inclined surface extending slightly downwardly and outwardly. Thus, even when the piston 6 is in the TDC position, the upper sub-surfaces 38, 38 can define a communication space communicating between intake-side and exhaust-side regions of the combustion chamber in each of the cylinders 4.

Figure 5:
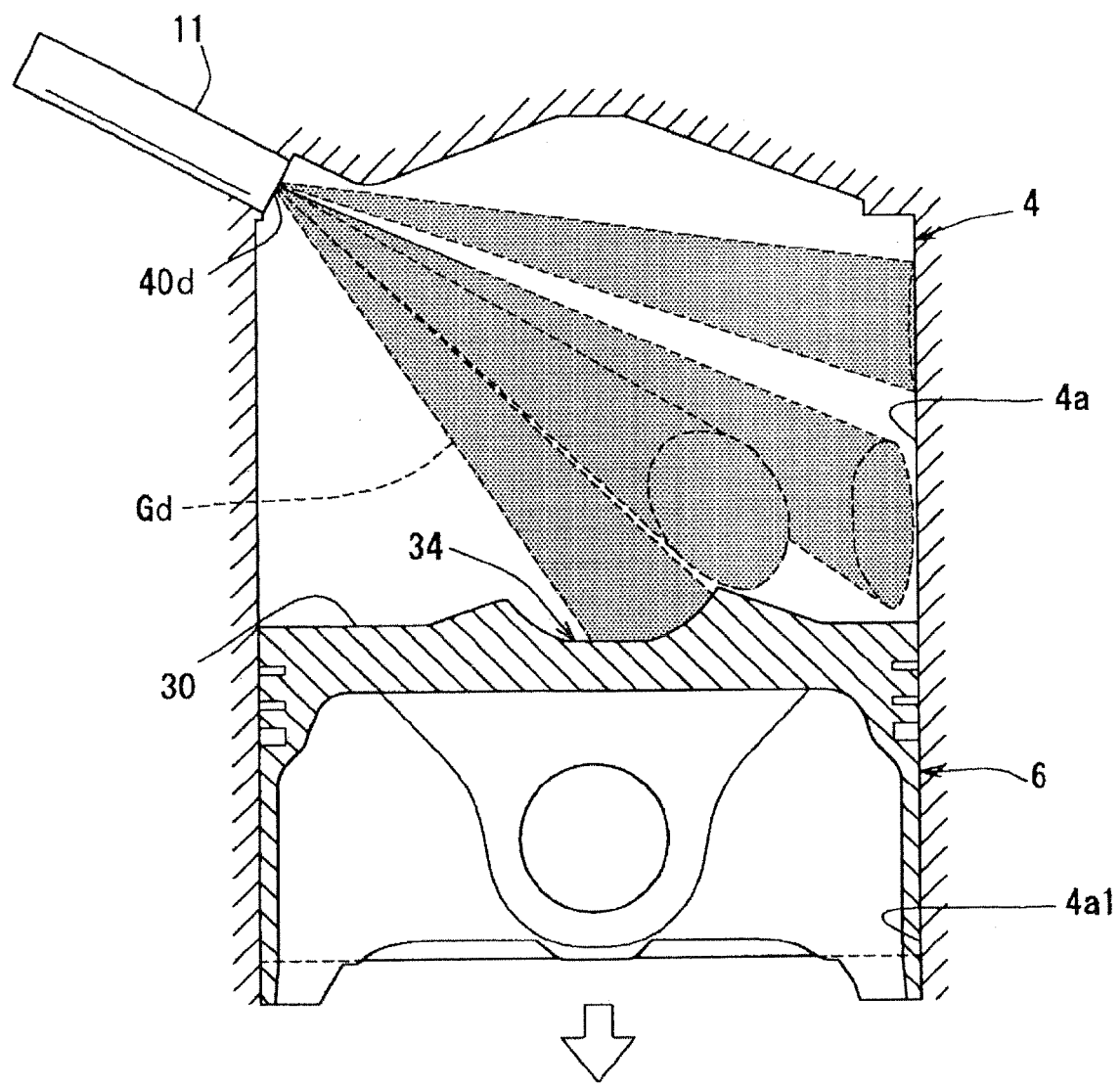
FIG. 5 is a side view showing a state of a fuel spray injected in an intake stroke.
Figure 6:
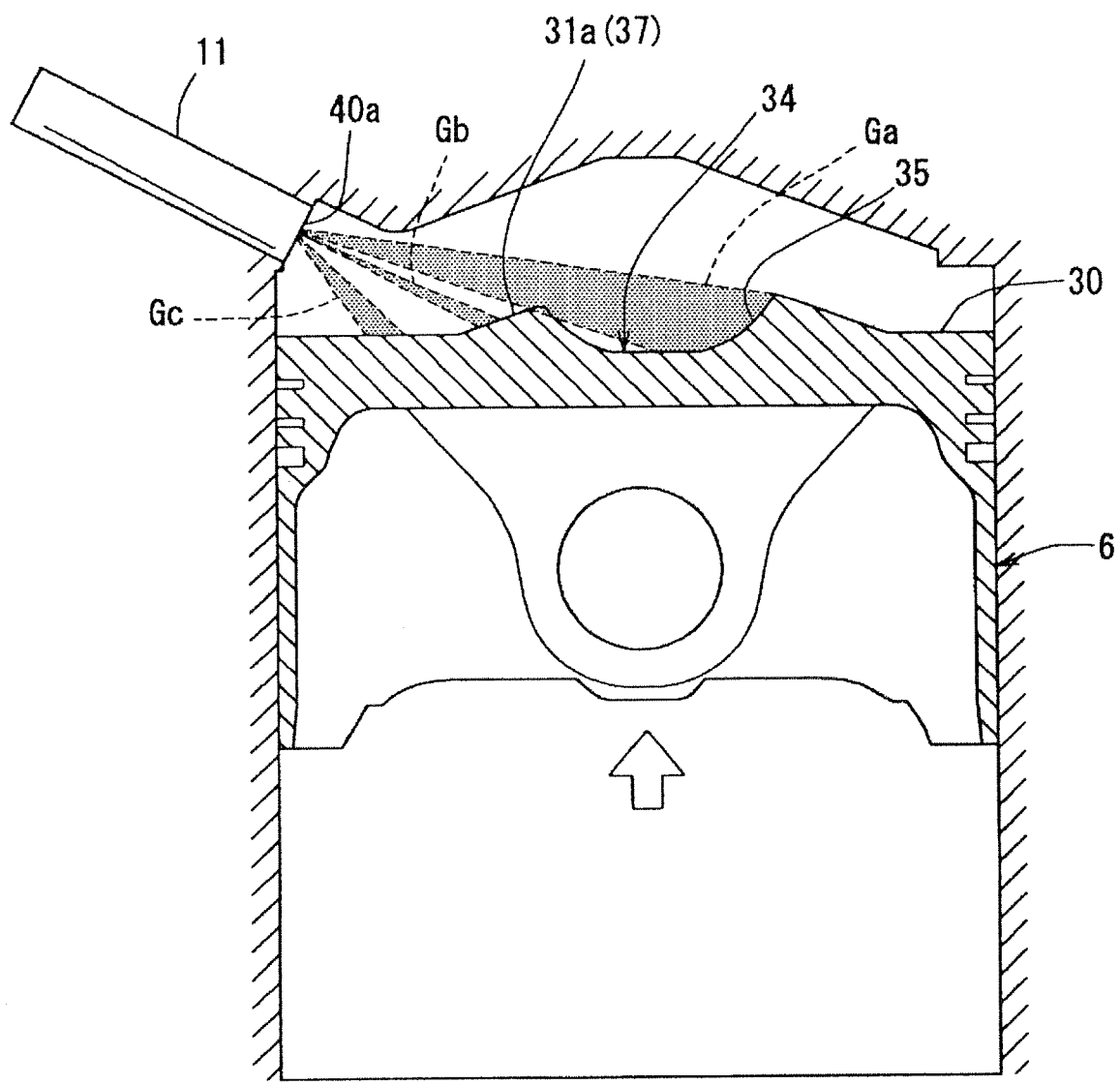
FIG. 6 is a side view showing a state of a fuel spray injected in a compression stroke.

With reference to FIGS. 4, 5 and 6, an engine control (particularly, fuel injection control) during cold engine operation will be described below. FIG. 4 is a time chart showing a fuel injection timing and an ignition timing, during cold engine operation. FIG. 5 is a side view showing a state of a fuel spray injected in an intake stroke, and FIG. 6 is a side view showing a state of a fuel spray injected in a compression stroke.

During cold engine operation, each of the multi-hole injector 11 and the spark plug 14 is controlled by the control unit 13, according to the time chart as shown in FIG. 4.

When cold engine operation is detected based on detection values from the catalyst temperature sensor 25 and other sensors, total two fuel injection timings, one for an intake stroke and the other for a compression stroke, are set to perform fuel injection twice per combustion cycle in a split manner.

Specifically, for example, the fuel injection timings are set such that a first fuel injection period F1 is completed at 80-degree crank angle (hereinafter described as "° CA"), and a second fuel injection period F2 is terminated at 325° CA. Two pulse widths w1, w2 in the first and second fuel injection periods F1, F2 are set in proportion to respective fuel injection amounts at the fuel injection timings, and a total of the two fuel injection amounts is set to form an air-fuel mixture having an approximately stoichiometric A/F ratio.

In the above split fuel injection, fuel injected in the first fuel injection period F1 can be vaporized/atomized in the combustion chamber in an early stage. Then, based on fuel injected in the second fuel injection F2, a rich air-fuel mixture can be formed around the spark plug 4. Thus, according to the technique of injecting fuel at the two timings, an in-cylinder air-fuel mixture can be weak-stratified.

Subsequently, after a TDC of a compression stroke, the spark plug 14 is activated at 380° CA (20° CA of an expansion stroke). This means that an ignition timing S is retarded to a timing falling within a period of the expansion stroke.

When the ignition timing S is retarded in the above manner, combustion energy of the engine is maintained as thermal energy at a larger rate, and thereby exhaust gas will be discharged to the exhaust system while keeping a high exhaust gas temperature.

Thus, high-temperature exhaust gas is supplied to the catalyst converter 24, so that a temperature of the catalyst in the catalyst converter 24 can be quickly raised to achieve earlier catalyst activation. This makes it possible to purify exhaust gas in an earlier stage.

The retard of the ignition timing S of the spark plug 14 is likely to cause instability in combustion state and failure in reliably producing combustion. In the first embodiment, an in-cylinder air-fuel mixture can be reliably weak-stratified. Thus, even if the ignition timing S is largely retarded, a stable combustion state can be obtained.

As shown in FIG. 5, the fuel injection timing for the fuel injection period in an intake stroke (first fuel injection period F1) is set to allow a fourth fuel spray Gd injected from the lowermost fourth spray hole 40d to enter the cavity 34 in the piston crown surface 30. In other words, the fuel injection timing is set to allow the fourth fuel spray Gd oriented in a downwardmost direction to be directed toward the piston crown surface 30, without reaching (attaching onto) a sidewall (liner) surface 4a of the cylinder 4.

As above, the fuel injection timing in an intake stroke is set to allow the fourth fuel spray Gd to be directed toward the piston crown surface 30. This prevents fuel from attaching onto a lower portion 4a1 of the sidewall (liner) surface 4a having the lowest temperature in the cylinder 4, so as to facilitate vaporization/atomization of the fuel injected in the intake stroke. This makes it possible to reduce HC (unburned gas) to be contained in exhaust gas.

Further, fuel is injected around 90° CA of an intake stroke. Thus, the fuel is injected in a timing when a piston speed and a charge flow speed in a combustion chamber are maximized, so that the vaporization/atomization can be more facilitated.

As shown in FIG. 6, the fuel injection timing for the fuel injection period in an compression stroke (second fuel injection period F2) is set to allow a first fuel spray Ga injected from the uppermost first spray hole 40a to be directed toward the cavity 34 in the piston crown surface 30. In other words, the fuel injection timing is set to allow the first fuel spray Ga oriented in an upwardmost direction to be directed toward the arc-shaped sub-surface 35 of the cavity 34.

In this case, each of the second fuel sprays Gb, Gb is directed toward the inclined sub-surface 31a (more specifically, the receiving portion 37) located closer to the injector 11 than the cavity 34. Even if the second fuel sprays Gb, Gb are injected toward the receiving portion 37, the second fuel sprays 34 will be pulled toward the cavity 34. Specifically, the second fuel sprays Gb, Gb each having a lowered penetration force due to impingement against the receiving portion 37 are pulled toward the cavity 34 (i.e., toward the central region of the piston crown surface 30) by a negative pressure generated in the cavity 34 as a result of passing of the first fuel spray Ga therethrough.

Figure 7A:
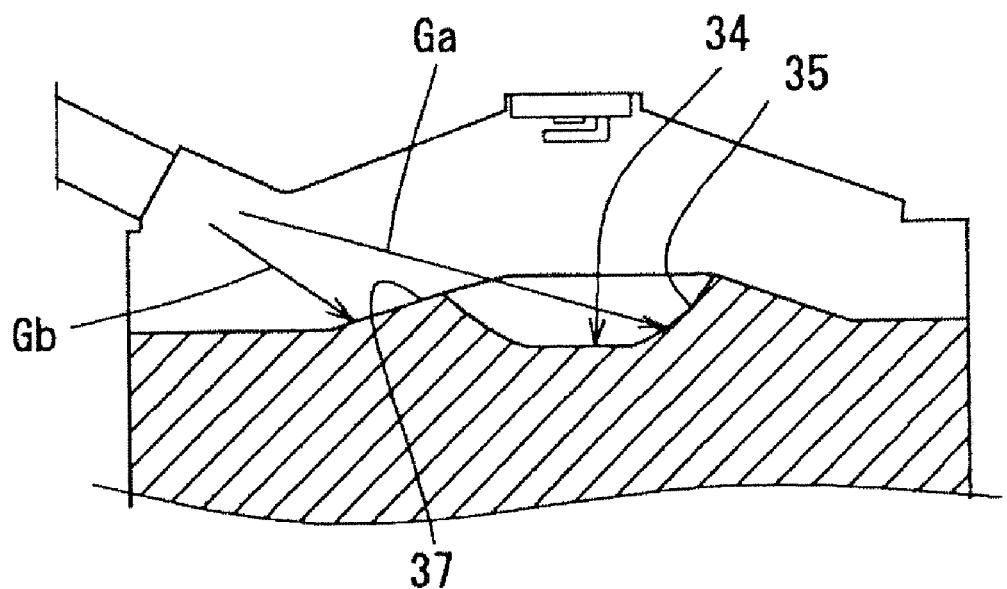
Figure 7B:
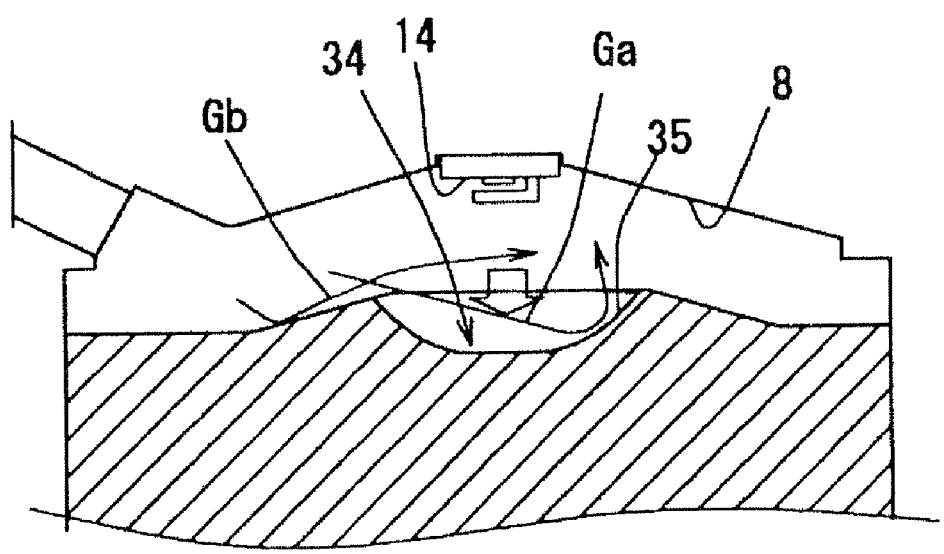

The above pulling action will be described based on the schematic diagrams of FIGS. 7A and 7B. FIG. 7A shows a state of fuel sprays just after being injected, and FIG. 7B shows a state of fuel sprays after a certain time has elapsed from the state in FIG. 7A.

As shown in FIG. 7A, the first fuel spray Ga is injected toward the arc-shaped sub-surface 35 of the cavity 34. Thus, as shown in FIG. 7B, the first fuel spray Ga is smoothly turned upwardly while being guided according to an inclination of the arc-shaped sub-surface 35, and directed toward the spark plug 14 (toward the roof wall surface 8).

Concurrently, as shown in FIG. 7A, the second fuel splays Gb are injected toward the receiving portion 37. Thus, the second fuel splays Gb impinge against the receiving portion 37 to have a lowered penetration force, and drift above the receiving portion 37. However, as shown in FIG. 7B, a negative pressure is generated in the cavity 34 after the first fuel spray Ga passes through the cavity 34, so that the second fuel splays Gb are pulled toward the cavity 34 by the negative pressure.

In the above manner, the second fuel sprays Gb, Gb are led to a vicinity of the cavity 34 as well as the first fuel spray Ga. This makes it possible to allow a rich air-fuel mixture to be located around the spark plug 14 in a larger amount.

Figure 8:
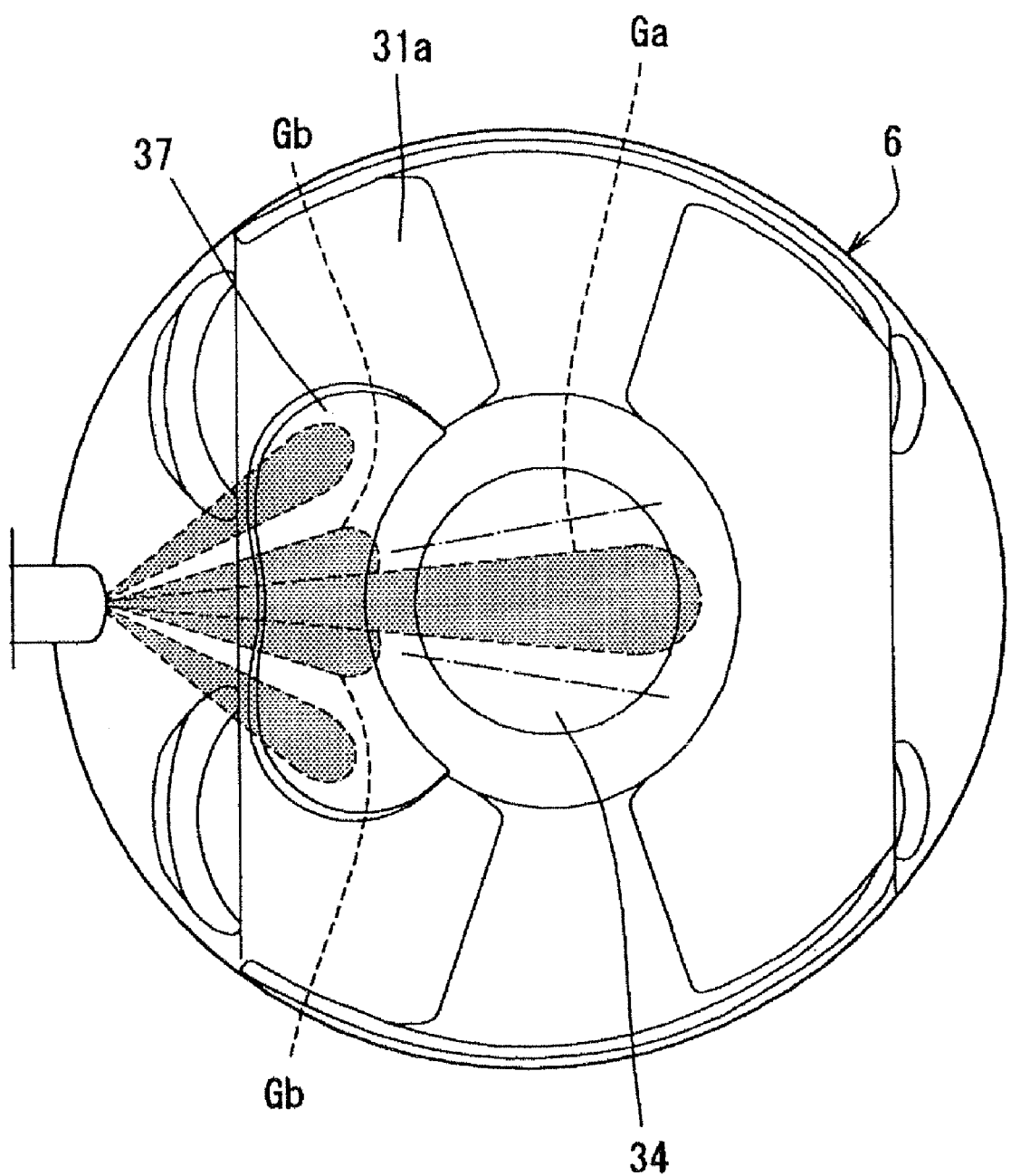
FIG. 8 is a top plan view showing a state of fuel sprays injected in the compression stroke.

As also shown in the top plan view of FIG. 8, the second fuel sprays Gb, Gb are injected into the receiving portion concavely depressed relative to the inclined sub-surface 31a. Thus, the second fuel sprays Gb, Gb will be reliably led toward the cavity 34 without leaking outwardly (toward the cylinder liner).

In the first embodiment, as shown in FIG. 8, the pair of right and left second fuel sprays Gb, Gb are formed in such a manner that the oriented direction of each of the second fuel sprays Gb, Gb (an extension line of each of the second fuel sprays Gb, Gb is indicated by the one-dot chain line) is set to overlap with the cavity 34 in top plan view. This makes it possible to facilitate inducing the pulling action based on the negative pressure.

Figure 9C:
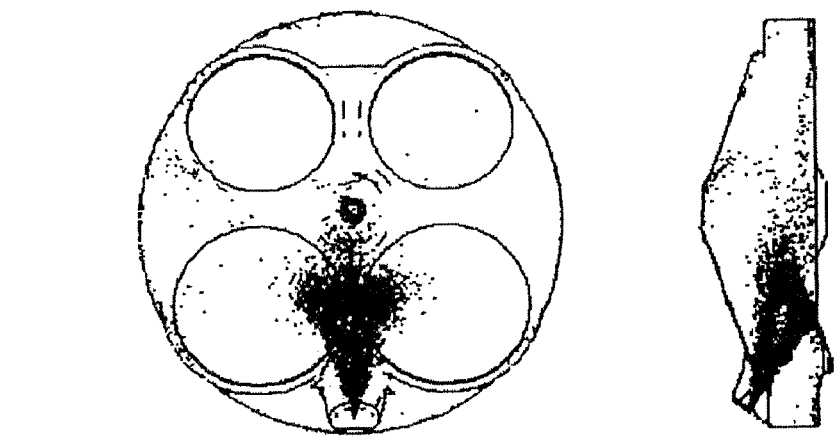
FIGS. 9A to 9C are simulation diagrams showing a state of an injected fuel spray at 325° CA.
Figure 9B:
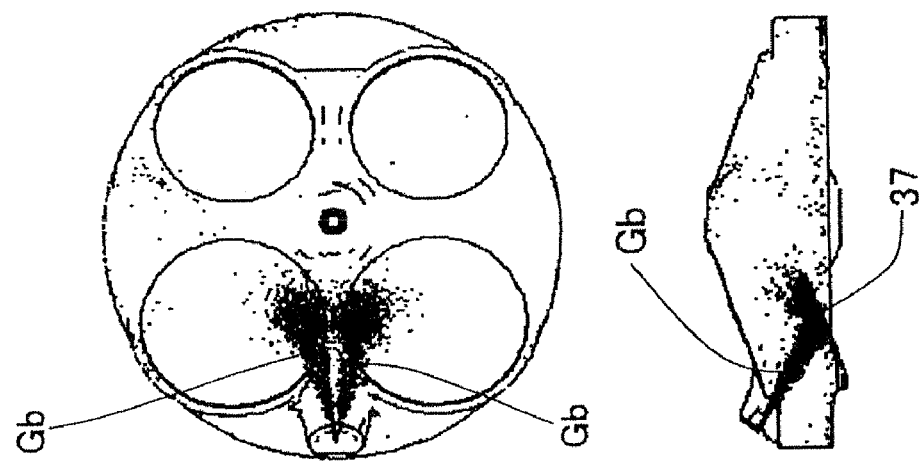
Figure 9A:
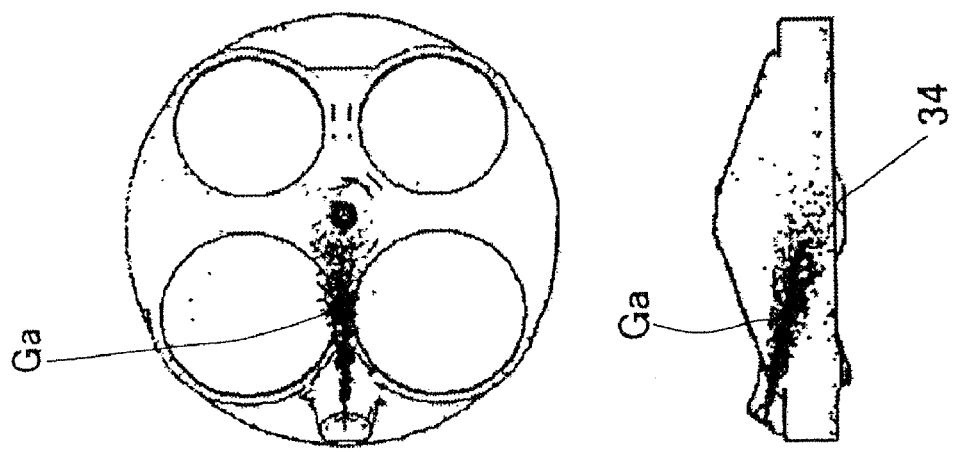
Figure 10C:
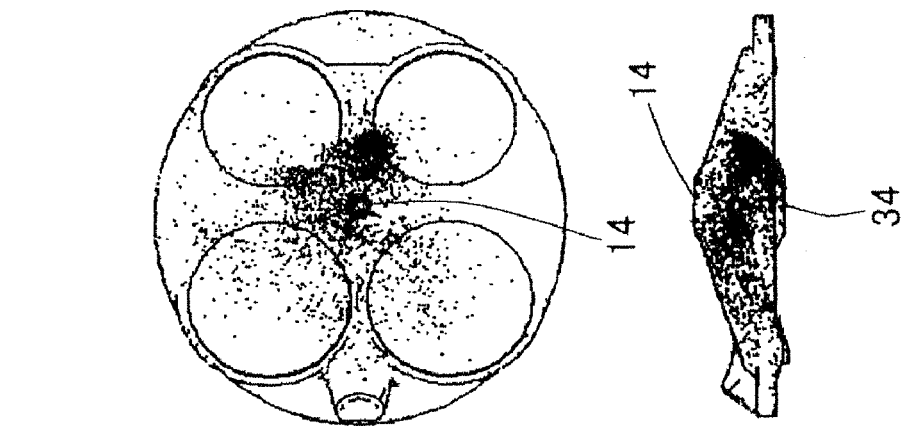
FIGS. 10A to 10C are simulation diagrams showing a state of the injected fuel spray at 340° CA.
Figure 10B:
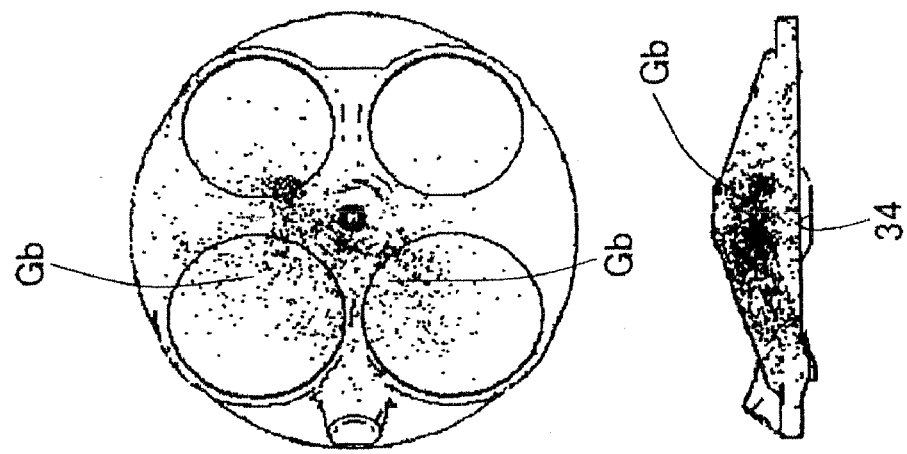
Figure 10A:
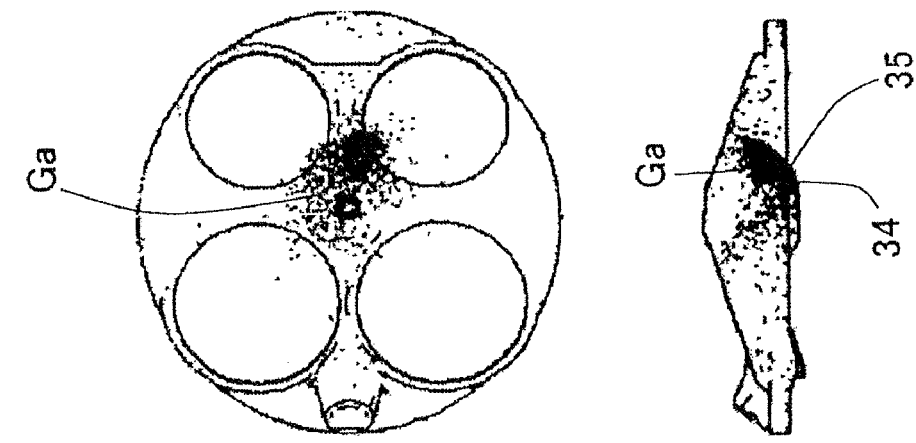
Figure 11C:
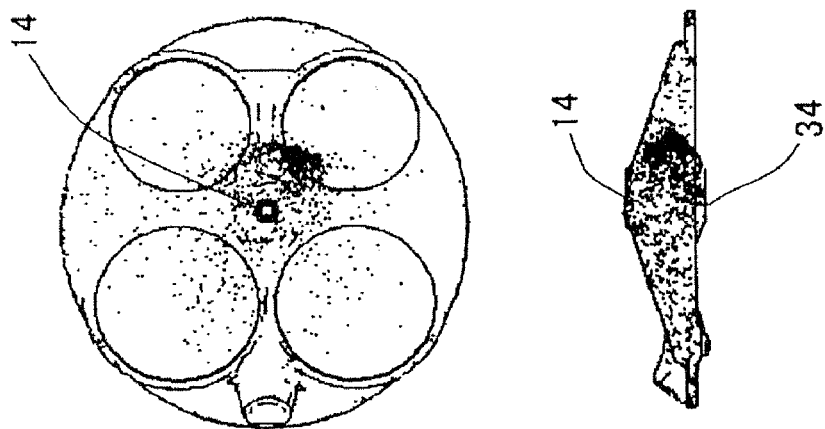
FIGS. 11A to 11C are simulation diagrams showing a state of the injected fuel spray at 350° CA.
Figure 11B:
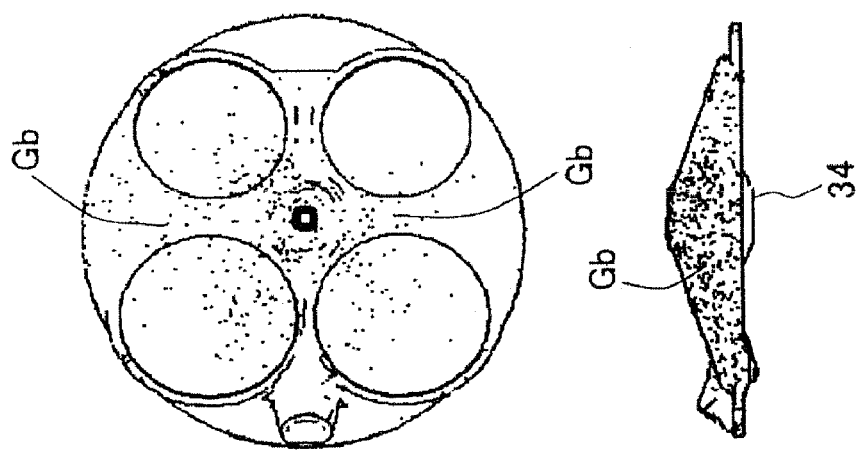
Figure 11A:
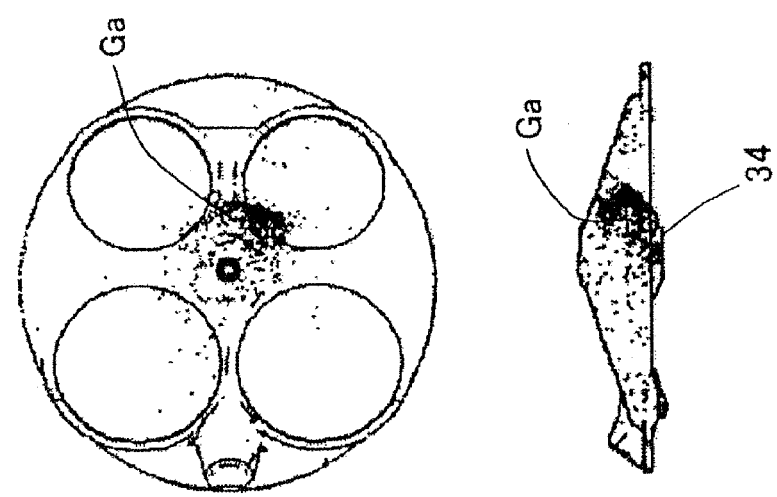
Figure 12C:
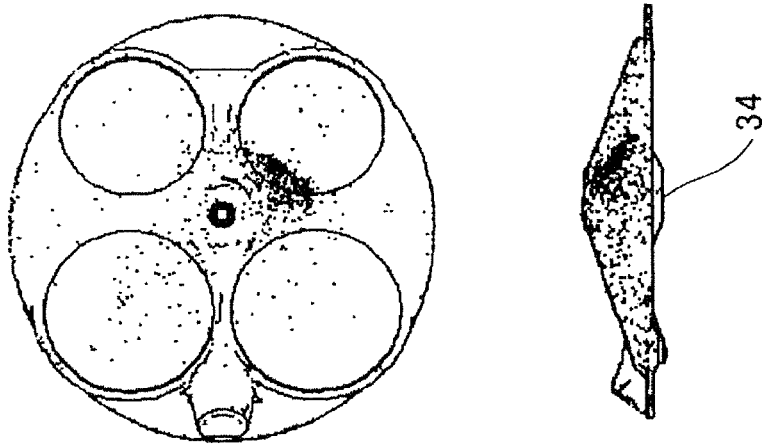
FIGS. 12A to 12C are simulation diagrams showing a state of the injected fuel spray at 360° CA.
Figure 12B:
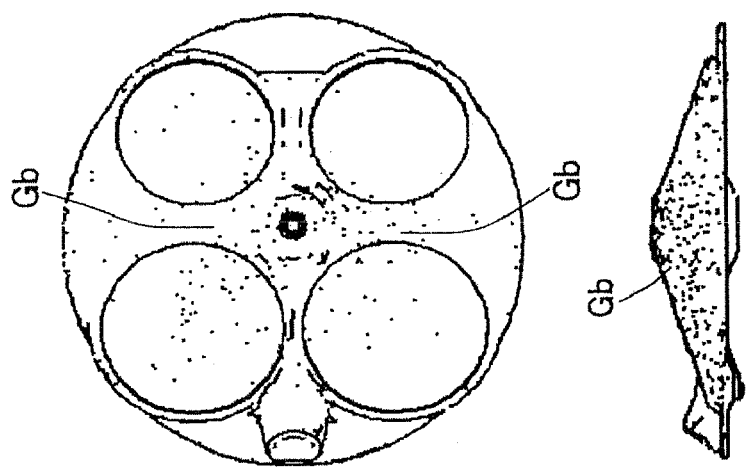

FIGS. 9A to 12C are simulation diagrams showing a state of an injected fuel spray in the engine according to the first embodiment. FIGS. 9A to 9C are simulation diagrams at 325° CA, and FIGS. 10A to 10C are simulation diagrams at 340° CA. FIGS. 11A to 11C are simulation diagrams at 350° CA, and FIGS. 12A to 12C are simulation diagrams at 360° CA. In these figures, FIGS. 9A, 10A, 11A and 12A show a state of an injected first fuel spray Ga, and FIGS. 9B, 10B, 11B and 12B show a state of injected second fuel sprays Gb, Gb. FIGS. 9C, 10C, 11C and 12C show a state of a combination of the injected first fuel spray Ga and the injected second fuel sprays Gb, Gb. Further, each of the figures includes a top plan view illustrated on an upper side and a side view illustrated on a lower side. In each of the figures, dots indicate droplets of the fuel spray.

As shown in FIG. 9A, at 325° CA just after completion of fuel injection, the first fuel spray Ga is injected into the cavity 34. Further, as shown FIG. 9B, the second fuel sprays Gb, Gb are bounced by the receiving portion 37, and drift thereabove. Thus, as shown in FIG. 9C, a large number of droplets are located around the injector 11.

Then, at 340° CA, as shown in FIG. 10A, the first fuel spray Ga is guided upwardly by the arc-shaped sub-surface 35 of the cavity 34 after impinging against the arc-shaped sub-surface 35. Further, as shown FIG. 10B, the second fuel sprays Gb, Gb are pulled toward the cavity 34 (in FIG. 10B, toward a position just above the cavity 34) by a negative pressure generated in the cavity 34 as a result of passing of the first fuel spray Ga therethrough. Thus, as shown in FIG. 10C, a large number of droplets are located around the spark plug 14.

Then, at 350° CA, as shown in FIG. 11A, the first fuel spray Ga is held on one side of the cavity 34. Further, as shown FIG. 11B, the second fuel sprays Gb, Gb are spread around the cavity 34. Thus, as shown in FIG. 11C, the number of droplets located around the spark plug 14 is reduced. Subsequently, the number of droplets is reduced as a whole along with progress of vaporization (atomization) of the droplets.

Figure 12A:
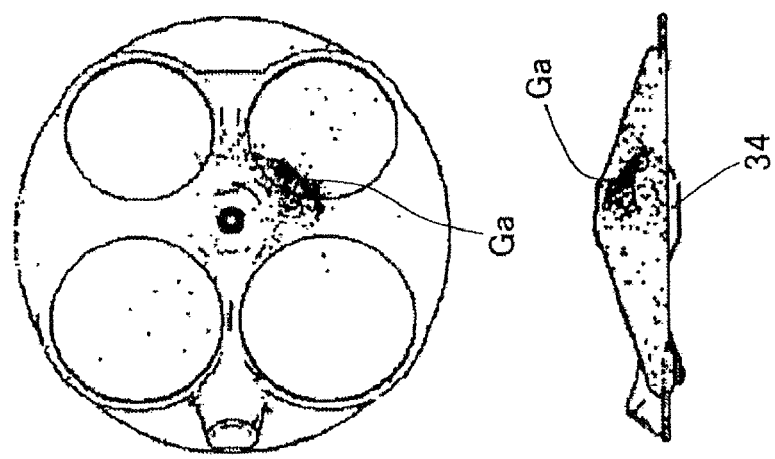

Then, at 360° CA, i.e., a compression TDC, as shown in FIG. 12A, the first fuel spray Ga is vaporized while being held on the one side of the cavity 34. Further, as shown FIG. 12B, the second fuel sprays Gb, Gb are vaporized while being spread over the combustion chamber. Thus, as shown in FIG. 12C, the droplets are almost vaporized although a part of the droplets remains on the one side of the cavity 34.

Figure 13:
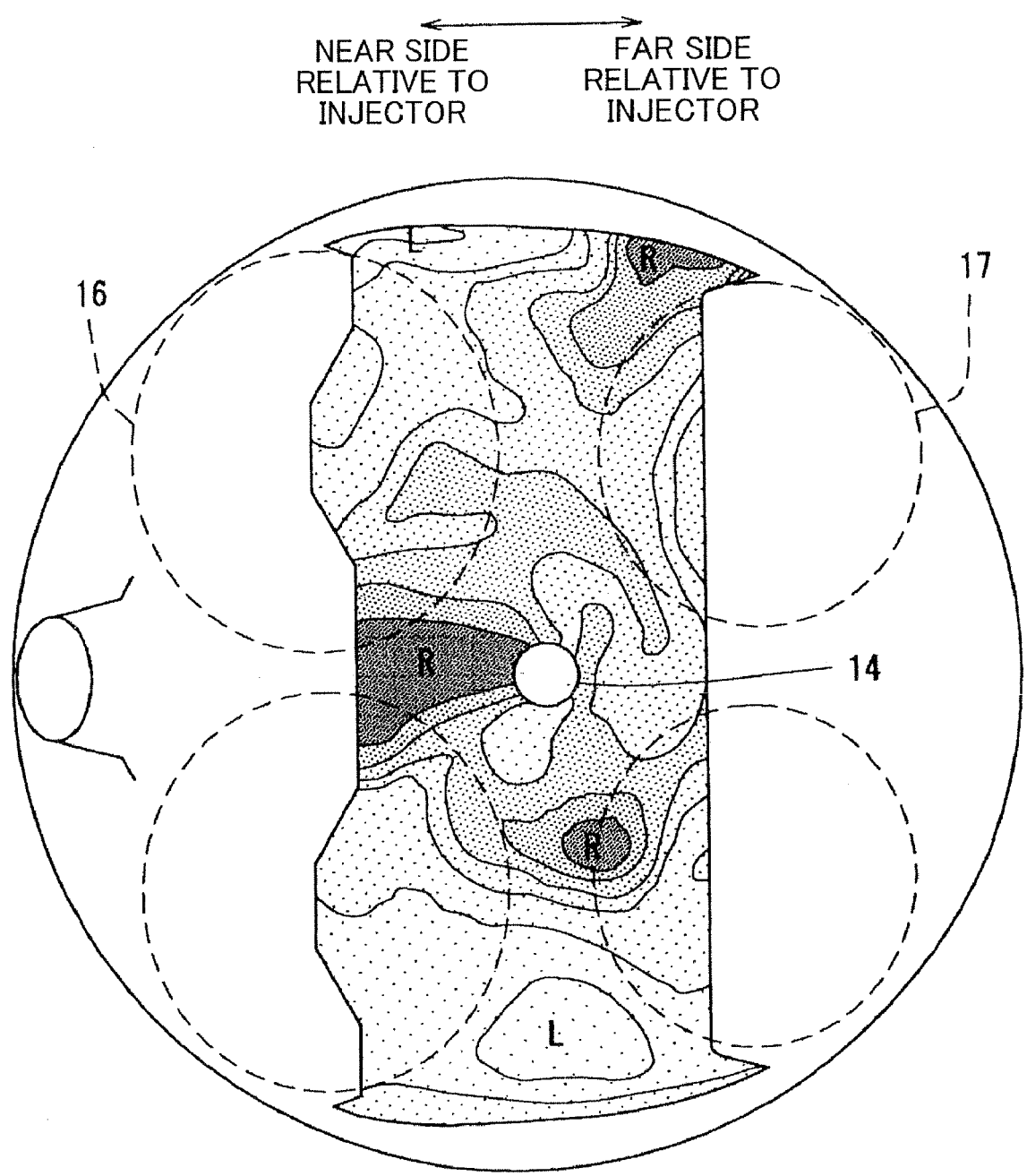
FIG. 13 is a distribution map of an air/fuel (A/F) ratio of an air-fuel mixture around a spark plug at 360° CA.

FIG. 13 is a distribution map of an air/fuel (A/F) ratio of an air-fuel mixture around a spark plug at 360° CA. In FIG. 13, a region R indicates the richest region, and a region L indicates the leanest region. As shown in FIG. 13, at 360° CA, the A/F ratio of the air-fuel mixture varies relatively widely, and a rich air-fuel mixture (R) exists on the side of the injector with respect to the spark plug 14. A rich air-fuel mixture (R) also exists in a far-side region of the combustion chamber away from the spark plug 14. A lean air-fuel mixture (L) exists in a wide range.

Figure 14:
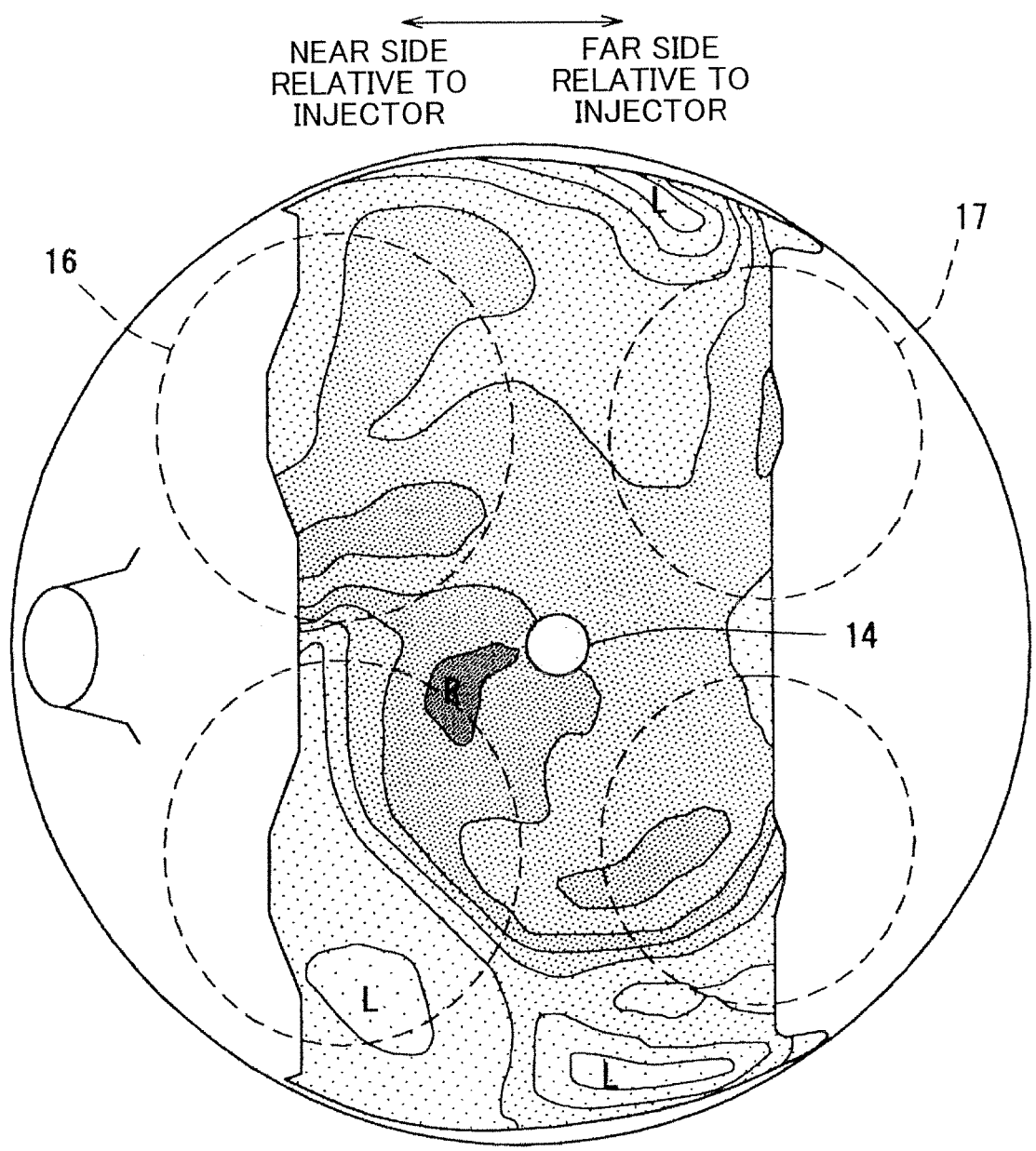
FIG. 14 is a distribution map of an air/fuel (A/F) ratio of an air-fuel mixture around a spark plug at 380° CA.

FIG. 14 is a distribution map of an air/fuel (A/F) ratio of an air-fuel mixture around the spark plug at 380° CA just before an ignition timing. As shown in FIG. 14, at 380° CA, a relatively rich air-fuel mixture (R) exists (the A/F ratio is relatively rich) in a vicinity of the spark plug 14, and the A/F ratio becomes leaner in a direction away from the spark plug 14. This shows that a so-called weak-stratified air-fuel mixture distribution mode is achieved. This makes it possible to enhance ignitability of the air-fuel mixture by the spark plug 14.

As above, vaporization/atomization of fuel is improved to enhance ignitability of an air-fuel mixture. Thus, even if the ignition timing S is retarded, combustion of the air-fuel mixture can be reliably produced while increasing an exhaust gas temperature.

A function and advantageous effect of the engine according to the first embodiment will be described below.

In the first embodiment, a timing of terminating fuel injection from the injector 11 (in the first embodiment, a timing of the end of the second fuel injection period F2) is set in a later period of an compression stroke, so that the first fuel spray Ga introduced into the cavity 34 is turned toward the roof wall surface 8 defining the combustion chamber 7 while being guided by the arc-shaped sub-surface 35 of the cavity 34, and the second fuel sprays Gb, Gb impinge against the inclined sub-surface 31a (receiving portion 37) of the raised region 31 located closer to the injector 11 than the cavity 34, to cause the second fuel sprays Gb, Gb to be pulled toward the cavity 34 by a negative pressure generated in the cavity 34 as a result of passing of the first fuel spray Ga, Gb therethrough.

Thus, the second fuel sprays Gb, Gb can be readily led to a location of the cavity 34 (the central region of the piston crown surface 30), as well as the first fuel spray Ga, and, after the piston 6 is moved upwardly, a large amount of fuel sprays (rich air-fuel mixture) can be held around the spark plug 14. In addition, fuel is injected obliquely downwardly. Thus, in a homogenous combustion mode during normal (warmed-up) engine operation, fuel can be evenly injected all over the combustion chamber in each cylinder.

Therefore, the direct-injection spark-ignition engine E according to the first embodiment can maximally hold the injected fuel sprays around the spark plug 14 so as to reliably stabilize a combustion state in a combustion mode for promoting catalyst activation during cold engine operation, while enhancing combustion efficiency in a homogenous combustion mode during normal (warmed-up) engine operation. In the first embodiment, the fuel injection timing is set such that the second fuel injection period is terminated at 325° CA. This means that the second fuel injection period is terminated at the latest timing in the later period of a compression stroke, just before a compression TDC. Thus, fuel is injected when the piston 6 is located just before in a compression TDC position, to allow the first fuel spray Ga and the second fuel sprays Gb, Gb to be more reliably led to the location of the cavity 34 while being more reliably brought into impingement against respective ones of the arc-shaped sub-surface 35 of the cavity 34 and the inclined sub-surface 31a of the raised region 31. This makes it possible to more effectively hold the fuel sprays around the spark plug 14.

In the first embodiment, at least a part of an injection area of each of the second fuel sprays Gb, Gb overlaps with the cavity 34 in top plan view (see FIG. 8). Thus, the second fuel sprays Gb, Gb can be more reliably led to the location of the cavity 34. This makes it possible to sufficiently subject the second fuel sprays Gb, Gb to an action of the negative pressure generated by passing of the first fuel spray Ga through the cavity 34, to more effectively hold fuel sprays around the spark plug 14.

In the first embodiment, a total injection amount of the two second fuel sprays Gb, Gb injected from the injector 11 is set to be greater than an injection amount of the first fuel spray Ga. Thus, the total injection amount of the second fuel sprays Gb, Gb becomes greater than the injection amount of the first fuel spray Ga to be used for pulling the second fuel sprays Gb, Gb toward the cavity 34, so that an amount of fuel sprays to be pulled toward the cavity 34 can be effectively increased. This makes it possible to increase an amount of the second fuel sprays Gb, Gb having a potential to reside close to the spark plug 14, to effectively hold fuel sprays around the spark plug 14.

In the first embodiment, a height position of the upper edge 34b in the region of the cavity 34 on the far side with respect to the injector 11 is set to be higher than that of the upper edge 34a in the region of the cavity 34 on the near side with respect to the injector 11. This makes it possible to allow the first fuel spray Ga to reliably enter the cavity 34 and reliably impinge against the arc-shaped sub-surface 35. In addition, the second fuel sprays Gb, Gb can be reliably pulled toward the cavity 34. Thus, a larger amount of fuel sprays can be held in the location of the cavity 34, so that the fuel sprays can be more effectively held around the spark plug 14.

In the first embodiment, a fuel injection period is divided into at least two periods (F1, F2) in an intake stroke and a compression stroke, and the ignition timing S of the spark plug 14 is set in a period after a compression TDC. The fuel injection performed at the at least two separate timings (F1, F2) in a period of an intake stroke and a period of a compression stroke allows an air-fuel mixture in the combustion chamber in each of the cylinders 4 to be weak-stratified. In addition, the ignition performed at the timing set in a period after a compression TDC allows an exhaust gas temperature to be increased. This makes it possible to produce more stable combustion while increasing a temperature of the exhaust system to facilitate earlier catalyst activation.

In the first embodiment, the arc-shaped sub-surface 35 of the cavity 34 is formed in an arc shape in cross-sectional view. Alternatively, such a sub-surface may be formed as a simple flat inclined sub-surface to allow the first fuel spray Ga to be turned toward the roof wall surface 8 by the inclined sub-surface.

Figure 15:
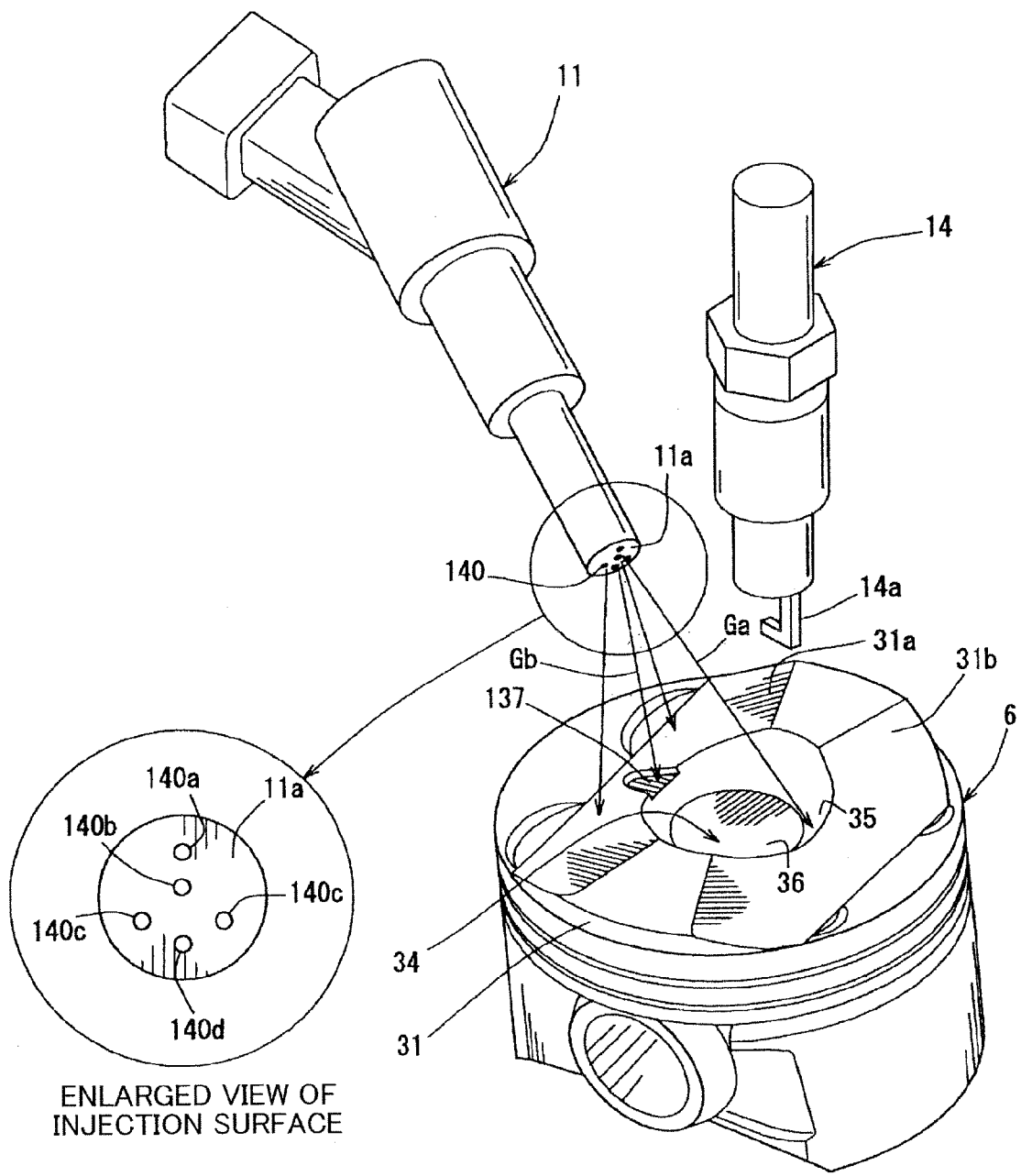
FIG. 15 is a perspective view showing a specific arrangement of a multi-hole injector, a piston and a spark plug in a direct-injection spark-ignition engine according to a second embodiment of the present invention.

A direct-injection spark-ignition engine E according to a second embodiment of the present invention will be described below. FIG. 15 is a perspective view showing the direct-injection spark-ignition engine according to the second embodiment, which corresponds to FIG. 2. In the following description, the same element or component as that in the first embodiment is defined by a common reference numeral or code, and its description will be omitted.

In the second embodiment, the number of spray holes 140a, 140b, etc, of a multi-hole injector 11 is changed from six in the first embodiment to five, and a receiving portion 137 provided in an inclined sub-surface 31a of the piston 6 is modified in response to the change in the number of spray holes 140a, 140b, etc.

As shown in the enlarged view of FIG. 15, an injection surface 11a of the multi-hole injector 11 has one first spray hole 140a formed in an upper central region thereof, one second spray hole 140b formed in a central region thereof below the first spray hole, two third spray holes 140c, 140c formed in respective ones of right and left regions thereof below the second spray hole, and one fourth spray hole 140d formed in a lower central region thereof.

In other words, the number of the second spray holes 140b as a second-uppermost spray hole is set to one to reduce a total number of the spray holes 1 140a, 140b, etc, and narrow an injection area of the second-uppermost spray hole.

The total number of the spray holes 140a, 140b, etc, is reduced in the above manner to narrow the injection area so as to prevent fuel sprays from attaching onto a sidewall (liner) of a cylinder. Further, the narrowed injection area of the second-uppermost spray hole allows an area of a receiving portion 137 to be reduced, so that a compression ratio can be increased.

More specifically, the reduction in the number of the second spray holes of the multi-hole injector 11 allows the receiving portion 137 to be formed in a generally U shape in top plan view, so that a combustion space can be reduced.

Further, the receiving portion 137 formed in a generally U shape in top plan view can reliably guide a second fuel spray Gb injected from the second spray hole 140b to allow the second fuel spray Gb to be reliably pulled toward a cavity 34.

In the second embodiment, a force for pulling the second fuel spray Gb toward a cavity 34 is a negative force generated in the cavity 34 as a result of passing of a first fuel spray therethrough, as with the first embodiment.

In the second embodiment illustrated in FIG. 15, the second fuel spray Gb can be pulled toward the cavity 34 by a negative force generated in the cavity 34 as a result of passing of the first fuel spray therethrough, in the same manner as that in the first embodiment.

Thus, injected fuel sprays can be maximally held around the spark plug 14 to reliably stabilize a combustion state.

In the second embodiment, the receiving portion 137 of the piston 6 has a generally U shape in top plan view. Thus, a compression ratio of the engine E can be increased as compared with the engine according to the first embodiment. This makes it possible to further enhance engine efficiency.

Although the present invention has been described based on preferred embodiments thereof, the present invention is not limited to the above embodiments, but includes any other embodiment applicable to a direct-injection spark-ignition engine.

In the last place, a feature and an advantage effect of the present invention disclosed in the above embodiments will be summarized as follows.

The present invention provides a direct-injection spark-ignition engine which comprises a multi-hole injector adapted to inject a plurality of fuel sprays obliquely downwardly from a peripheral position of a roof wall surface defining a combustion chamber, a spark plug disposed at a center of the combustion chamber-defining roof wall surface, and a concave cavity provided in a central region of a piston crown surface of a piston located in opposed relation to the spark plug. In the direct-injection spark-ignition engine, the injector has at least two spray holes consisting of a first spray hole adapted to form a first fuel spray in such a manner as to, after being injected, directly enter the cavity at a given timing in a later period of a compression stroke, and a second spray hole adapted to form a second fuel spray in such a manner as to be located below the first fuel spray, and wherein a timing of fuel injection from the injector during cold engine operation is set in such a manner as to allow the first fuel spray to be turned toward the combustion chamber-defining roof wall surface after entering the cavity, and allow the second fuel spray to impinge against a region of the piston crown surface located closer to the injector than the cavity, so as to cause the second fuel spray having a lowered penetration force due to the impingement to be pulled toward the cavity by a negative pressure generated in the cavity as a result of passing of the first fuel spray therethrough, and held around the spark plug.

In the direct-injection spark-ignition engine of the present invention, the timing of fuel injection from the injector during cold engine operation is set in such a manner as to allow the first fuel spray entering the cavity at a give timing in a later period of a compression stroke to be turned toward the combustion chamber-defining roof wall surface, and allow the second fuel spray to be pulled toward the cavity by a negative pressure generated in the cavity as a result of passing of the first fuel spray therethrough. Thus, the second fuel spray can be reliably led to a location of the cavity (the central region of the piston crown surface), as well as the first fuel spray, and, after the piston is moved upwardly, a large amount of fuel sprays (rich air-fuel mixture) can be held around the spark plug. In addition, fuel is injected obliquely downwardly. Thus, in a homogenous combustion mode during normal (warmed-up) engine operation, fuel can be evenly injected all over the combustion chamber in each cylinder.

Preferably, in the direct-injection spark-ignition engine of the present invention, the cavity has a guide sub-surface provided in a part of a region thereof on a far side with respect to the injector to allow the first fuel spray injected toward the cavity to be directed toward the combustion chamber-defining roof wall surface, and the piston crown surface has a pentroof-shaped inclined sub-surface formed in a region thereof located closer to the injector than the cavity, wherein a timing of fuel injection from the injector during cold engine operation is set in such a manner as to allow the first fuel spray to be turned toward the combustion chamber-defining roof wall surface, while being guided by the guide sub-surface after entering the cavity, and allow the second fuel spray to impinge against the pentroof-shaped inclined sub-surface, so as to cause the second fuel spray having a lowered penetration force due to the impingement to be pulled toward the cavity by a negative pressure generated in the cavity as a result of passing of the first fuel spray therethrough, and held around the spark plug.

According to this feature, respective movements of the first fuel spray and the second fuel spray can be more reliably controlled using the guide sub-surface of the cavity and the inclined sub-surface of the piston crown surface.

More preferably, in the above direct-injection spark-ignition engine, a height position of an upper edge in the region of the cavity on the far side with respect to the injector is higher than that of an upper edge in a region of the cavity on a near side with respect to the injector, in cross-section of the piston taken along a cutting-plane line passing through a center of the cavity in top plan view.

This feature makes it possible to allow the first fuel spray to reliably enter the cavity and allow the second fuel sprays to be reliably pulled toward the cavity. Thus, a larger amount of fuel sprays can be held in the location of the cavity, so that the fuel sprays can be more effectively held around the spark plug.

Preferably, in the direct-injection spark-ignition engine of the present invention, the timing of the fuel injection during cold engine operation is set to allow the fuel injection to be terminated at a time point when ¾ of an entire period of a compression stroke has elapsed.

According to this feature, fuel is injected when the piston is located just before in a compression TDC position, to allow the first fuel spray and the second fuel spray to be more reliably led to the location of the cavity. This makes it possible to more effectively hold the fuel sprays around the spark plug.

Preferably, in the direct-injection spark-ignition engine of the present invention, the fuel injection during cold engine operation is performed at least two separate timings including a period of an intake stroke and a later period of a compression stroke, and an ignition timing of the spark plug during cold engine operation is set in a period after a top dead center of a compression stroke.

According to this feature, the fuel injection performed at the at least two separate timings in a period of an intake stroke and a period of a compression stroke allows an air-fuel mixture in the combustion chamber in each of the cylinders to be weak-stratified. In addition, the ignition performed at the timing set in a period after a compression TDC allows an exhaust gas temperature to be increased. This makes it possible to produce more stable combustion while increasing a temperature of the exhaust system to facilitate earlier catalyst activation.

Preferably, in the direct-injection spark-ignition engine of the present invention, at least a part of an injection area of the second fuel spray overlaps with the cavity in top plan view.

This feature makes it possible to sufficiently subject the second fuel spray to an action of the negative pressure generated by passing of the first fuel spray through the cavity, to more effectively hold fuel sprays around the spark plug.

Preferably, in the direct-injection spark-ignition engine of the present invention, an injection amount of the second fuel spray is set to be greater than that of the first fuel spray.

According to this feature, the injection amount of the second fuel spray becomes greater than that of the first fuel spray to be used for pulling the second fuel spray toward the cavity, so that an amount of a fuel spray to be pulled toward the cavity can be effectively increased. This makes it possible to increase an amount of fuel sprays having a potential to reside close to the spark plug, to effectively hold fuel sprays around the spark plug.

More preferably, in the above direct-injection spark-ignition engine, the first spray hole is provided in a number of one to form one first fuel spray, and the second spray hole is provided in a number of two to form two second fuel sprays, and wherein the first spray hole and the second spray holes are arranged to allow the two second fuel sprays to be located on respective ones of opposite lateral sides of the first fuel spray, in top plan view.

According to this feature, the second fuel sprays having a relatively large injection amount are injected toward two positions separately. This makes it possible facilitate vaporization (atomization) of droplets of the second fuel sprays as compared with case where the second fuel sprays are concentrically injected toward one position.

This application is based on Japanese application serial No. 2008-186019 filed in Japan Patent Office on Jul. 17, 2008, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A direct-injection spark-ignition engine comprising:
   a multi-hole injector adapted to inject a plurality of fuel sprays obliquely downwardly from a peripheral position of a roof wall surface defining a combustion chamber,
   a spark plug disposed at a center of the combustion chamber-defining roof wall surface, and
   a concave cavity provided in a central region of a piston crown surface of a piston located in opposed relation to the spark plug,
   wherein:
   the injector has at least two spray holes consisting of a first spray hole adapted to form a first fuel spray to, after being injected, directly enter the cavity at a given timing in a later period of a compression stroke, and a second spray hole adapted to form a second fuel spray to be located below the first fuel spray, and
   wherein a timing of fuel injection from the injector during cold engine operation is set to allow the first fuel spray to be turned toward the combustion chamber-defining roof wall surface after entering the cavity, and allow the second fuel spray to impinge against a region of the piston crown surface located closer to the injector than the cavity, to cause the second fuel spray having a lowered penetration force due to the impingement to be pulled toward the cavity by a negative pressure generated in the cavity as a result of passing of the first fuel spray therethrough, and held around the spark plug.

2. The direct-injection spark-ignition engine as defined in claim 1, wherein the timing of the fuel injection during cold engine operation is set to allow the fuel injection to be terminated at a time point when ¾ of an entire period of a compression stroke has elapsed.

3. The direct-injection spark-ignition engine as defined in claim 1, wherein:

the fuel injection during cold engine operation is performed at least two separate timings including a period of an intake stroke and a later period of a compression stroke; and an ignition timing of the spark plug during cold engine operation is set in a period after a top dead center of a compression stroke.

4. The direct-injection spark-ignition engine as defined in claim 1, wherein at least a part of an injection area of the second fuel spray overlaps with the cavity in top plan view.

5. The direct-injection spark-ignition engine as defined in claim 1, wherein an injection amount of the second fuel spray is set to be greater than that of the first fuel spray.

6. A direct-injection spark-ignition engine comprising:

a multi-hole injector adapted to inject a plurality of fuel sprays obliquely downwardly from a peripheral position of a roof wall surface defining a combustion chamber, a spark plug disposed at a center of the combustion chamber-defining roof wall surface, and a concave cavity provided in a central region of a piston crown surface of a piston located in opposed relation to the spark plug, wherein:

the cavity has a guide sub-surface provided in a part of a region thereof on a far side with respect to the injector to allow the first fuel spray injected toward the cavity to be directed toward the combustion chamber-defining roof wall surface;

the piston crown surface has a pentroof-shaped inclined sub-surface formed in a region thereof located closer to the injector than the cavity; and the injector has at least two spray holes consisting of a first spray hole adapted to form a first fuel spray to, after being injected, directly enter the cavity at a given timing in a later period of a compression stroke, and a second spray hole adapted to form a second fuel spray to be located below the first fuel spray, and wherein a timing of fuel injection from the injector during cold engine operation is set to allow the first fuel spray to be turned toward the combustion chamber-defining roof wall surface, while being guided by the guide sub-surface after entering the cavity, and allow the second fuel spray to impinge against the pentroof-shaped inclined sub-surface, to cause the second fuel spray having a lowered penetration force due to the impingement to be pulled toward the cavity by a negative pressure generated in the cavity as a result of passing of the first fuel spray therethrough, and held around the spark plug.

7. The direct-injection spark-ignition engine as defined in claim 6, wherein a height position of an upper edge in the region of the cavity on the far side with respect to the injector is higher than that of an upper edge in a region of the cavity on a near side with respect to the injector, in cross-section of the piston taken along a cutting-plane line passing through a center of the cavity in top plan view.

8. The direct-injection spark-ignition engine as defined in claim 6, wherein the timing of the fuel injection during cold engine operation is set to allow the fuel injection to be terminated at a time point when ¾ of an entire period of a compression stroke has elapsed.

9. The direct-injection spark-ignition engine as defined in claim 6, wherein:

the fuel injection during cold engine operation is performed at least two separate timings including a period of an intake stroke and a later period of a compression stroke; and an ignition timing of the spark plug during cold engine operation is set in a period after a top dead center of a compression stroke.

10. The direct-injection spark-ignition engine as defined in claim 6, wherein at least a part of an injection area of the second fuel spray overlaps with the cavity in top plan view.

11. The direct-injection spark-ignition engine as defined in claim 6, wherein an injection amount of the second fuel spray is set to be greater than that of the first fuel spray.

12. The direct-injection spark-ignition engine as defined in claim 11, wherein the first spray hole is provided in a number of one to form one first fuel spray, and the second spray hole is provided in a number of two to form two second fuel sprays, and wherein the first spray hole and the second spray holes are arranged to allow the two second fuel sprays to be located on respective ones of opposite lateral sides of the first fuel spray, in top plan view.

\* \* \* \* \*